United States Patent
Tazaki et al.

(10) Patent No.: US 7,847,915 B2
(45) Date of Patent: Dec. 7, 2010

(54) OPTICAL ELEMENT

(75) Inventors: Keiko Tazaki, Tokyo (JP); Koji Ishizaki, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 728 days.

(21) Appl. No.: 11/593,120

(22) Filed: Nov. 6, 2006

(65) Prior Publication Data

US 2007/0052894 A1 Mar. 8, 2007

Related U.S. Application Data

(62) Division of application No. 10/629,908, filed on Jul. 30, 2003, now Pat. No. 7,224,426.

(30) Foreign Application Priority Data

Jul. 31, 2002 (JP) ............................. 2002-222850

(51) Int. Cl.
*G02F 1/13* (2006.01)
(52) U.S. Cl. .................................... 349/193
(58) Field of Classification Search ................ None
See application file for complete search history.

(56) References Cited

U.S. PATENT DOCUMENTS

| | | | |
|---|---|---|---|
| 3,852,092 A * | 12/1974 | Patterson et al. | 374/161 |
| 3,872,050 A * | 3/1975 | Benton et al. | 524/774 |
| 4,728,547 A * | 3/1988 | Vaz et al. | 349/16 |
| 5,555,114 A * | 9/1996 | Narita et al. | 349/98 |
| 5,680,188 A | 10/1997 | Yoshida et al. | |
| 5,691,092 A | 11/1997 | Ninomiya et al. | |
| 6,906,764 B2 | 6/2005 | Kashima et al. | |

(Continued)

FOREIGN PATENT DOCUMENTS

JP 2509372 4/1998

(Continued)

OTHER PUBLICATIONS

Japanese Patent Office, Notice of Reasons for Rejection, mailed Aug. 21, 2009 in Japanese Patent Application No. 2003-203620.

*Primary Examiner*—James A Dudek
(74) *Attorney, Agent, or Firm*—Oliff & Berridge, PLC

(57) ABSTRACT

An optical element including: an alignment substrate; a liquid crystal layer formed on the alignment substrate, made by forming and curing a film of a liquid crystalline material; and a protective layer having high hardness, formed on the liquid crystal layer. The protective layer is for protecting the liquid crystal layer from being deformed by externally exerted forces. Preferably, the protective layer has a modulus of elasticity (=(elastic deformation)/(total deformation)) of 0.6 or more and a plastic deformation of 0.5 μm or less as determined by pushing an indenter into the protective layer with a test force of 2 mN in accordance with the universal hardness test method. The optical element has the advantages that the film thickness distribution of the liquid crystal layer remains uniform even when forces are externally exerted to the optical element in the process of production of the optical element or in the course of incorporation of the optical element in a liquid crystal display, and that the optical element can maintain its high displaying quality even when incorporated in a liquid crystal display.

7 Claims, 5 Drawing Sheets

U.S. PATENT DOCUMENTS

| | | |
|---|---|---|
| 2003/0137619 A1 | 7/2003 | Ishizaki |
| 2004/0048950 A1 | 3/2004 | Nishida et al. |

FOREIGN PATENT DOCUMENTS

| | | |
|---|---|---|
| JP | A-11-072613 | 3/1999 |
| JP | A-2001-142065 | 5/2001 |
| JP | A-2001-159709 | 6/2001 |
| JP | A-2003-195319 | 7/2003 |
| WO | WO 01/06308 A1 | 1/2001 |

* cited by examiner

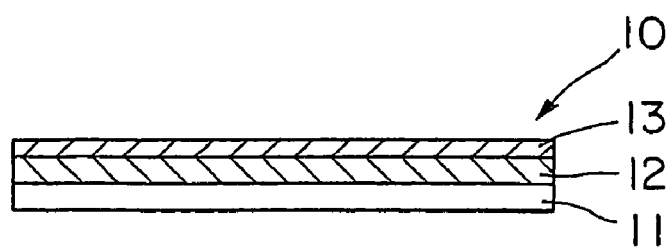
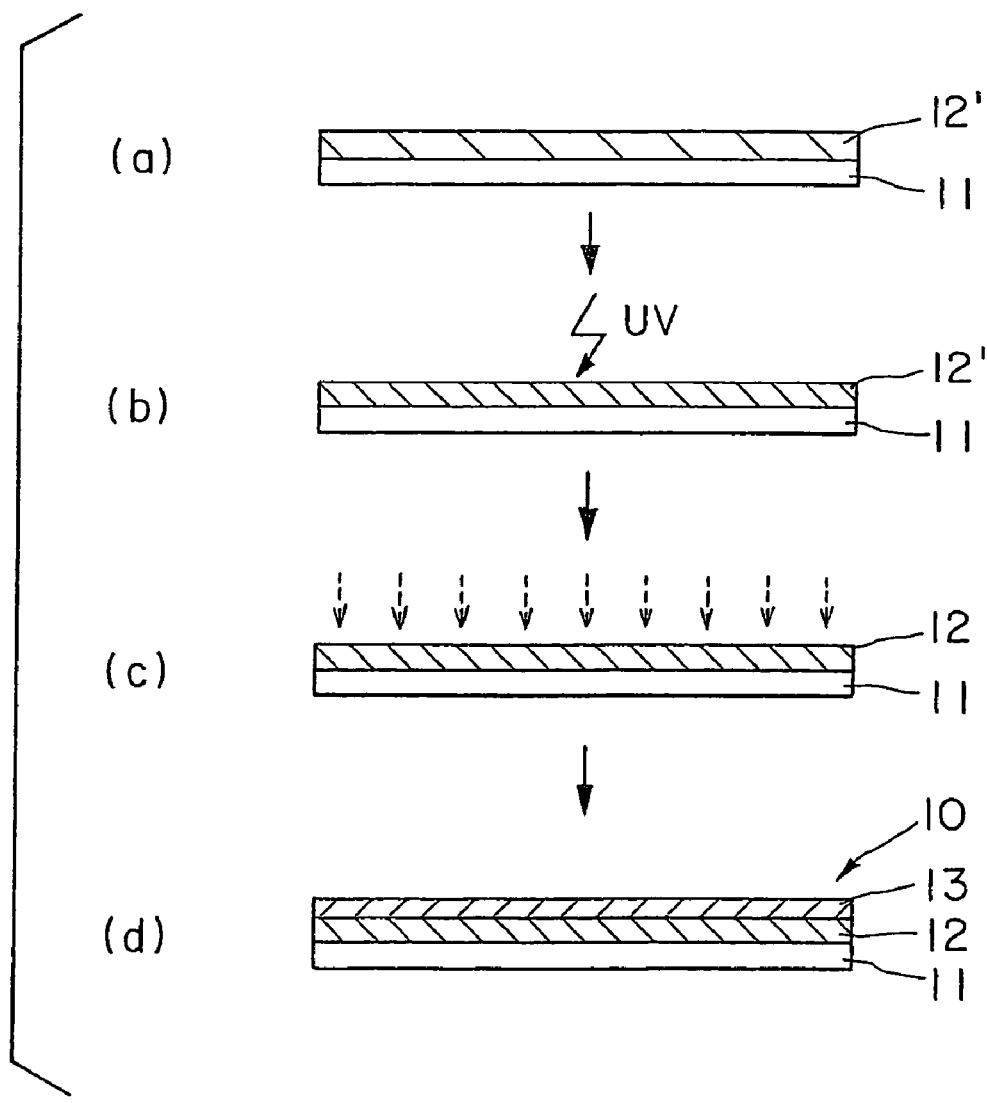

US 7,847,915 B2

OPTICAL ELEMENT

This is a Division of U.S. patent application Ser. No. 10/629,908 filed Jul. 30, 2003, now U.S. Pat. No. 7,224,426 B2. The entire disclosures of the prior applications are hereby incorporated by reference in their entirety.

BACKGROUND OF THE INVENTION

1. Field of the Invention

The present invention relates to an optical element, such as a polarized-light-separating element, a color filter, and a retardation film, for use in a liquid crystal display and the like. More particularly, the present invention relates to an optical element including a liquid crystal layer made from a liquid crystalline material such as a cholesteric liquid crystal and a nematic liquid crystal. The term "liquid crystal layer" as used herein refers to a layer having the nature of liquid crystal in an optical sense, and encompasses a layer in the solidified state that a liquid crystal phase is solidified with its molecular orientation maintained as it is.

2. Description of Related Art

In general, a conventional liquid crystal display is composed of: a liquid crystal cell that changes, in each pixel, the state of polarization of illumination light emitted by an illuminator (light source); a pair of polarizers that are arranged on the illumination light incident and emergent sides of the liquid crystal cell so that the liquid crystal cell is sandwiched between them; color filters (red, green and blue) that are provided on the individual pixels of the liquid crystal cell; and a retardation film (optical compensation sheet) for improving the visibility of the liquid crystal cell.

In the above-described conventional liquid crystal display, the illumination light emitted by the illuminator is usually non-polarized light, and when this light passes through the polarizer arranged on the illumination light incident side of the liquid crystal cell, 50% or more of the light is absorbed by the polarizer. Further, the illumination light emitted by the illuminator is usually white light, and when this light passes through the color filters (red, green and blue) provided on the individual pixels of the liquid crystal cell, 70% or more of the light is absorbed by the color filters. Namely, in a conventional liquid crystal display, illumination light emitted by an illuminator is mostly absorbed before it goes out from the viewing side of the display. Thus, the optical efficiency of a conventional liquid crystal display has been not necessarily high.

An illuminator with high output is therefore required for a conventional liquid crystal display of the above-described type to attain a display with sufficiently high brightness. However, the use of such an illuminator leads to a great increase in power consumption.

Under these circumstances, there has been proposed a method for efficiently utilizing light such as illumination light by the use of an optical element comprising a liquid crystal layer, such as a polarized-light-separating element or a color filter, wherein the optical element selectively transmits a part of light while reflecting a part of the reminder, and the reflected light is reused with the aid of a reflector or the like. Specifically, Japanese Patent Publication No. 2,509,372, for example, proposes a method for efficiently separating illumination light (non-polarized light) emitted by an illuminator to obtain specific polarized light. In this method, a polarized-light-separating element including a cholesteric liquid crystal layer is used in combination with a reflector capable of reflecting, while inverting the direction of rotation of light (circularly polarized light) that has been reflected by the polarized-light-separating element.

In addition, an attempt has been proposed in which a retardation film for eliminating a viewing-angle dependency is realized by utilizing a nematic liquid crystal layer having nematic regularity or a cholesteric liquid crystal layer having cholesteric regularity. Not only a λ/4 retardation film of a general band, but also a λ/4 retardation film of a broadband have been proposed for such a retardation film.

However, the part of the above-described optical element that functions optically is a liquid crystal layer made from a liquid crystalline material, so that this part usually has extremely low hardness even when the liquid crystal layer is in the solid phase state. Therefore, if forces are externally exerted to the liquid crystal layer in the process of production of the optical element or in the course of incorporation of the optical element in a liquid crystal display, there is the possibility that the liquid crystal layer has dents or the like on its surface and cannot maintain its uniform film thickness distribution. In the case where the liquid crystal layer in the above-described optical element has no uniform film thickness distribution, the state of polarization of light that comes out from the optical element is not uniform. If such an optical element is incorporated in a liquid crystal display, it is inevitable that the liquid crystal display has considerably lowered displaying quality. Further, if the above-described optical element is used as a retardation film to be incorporated in a liquid crystal cell of a liquid crystal display, a film thickness of the liquid crystal layer is varied by a spacer for holding a gap in the liquid crystal cell. As a result, there is generated a problem in that a desired retardation amount cannot be obtained.

SUMMARY OF THE INVENTION

The present invention was accomplished in the light of the aforementioned drawbacks in the related art. An object of the present invention is to provide a high-quality optical element including a liquid crystal layer, having the advantages that the film thickness distribution of the liquid crystal layer remains uniform even when forces are externally exerted to the optical element in the process of production of the optical element or in the course of incorporation of the optical element in a liquid crystal display, and that the optical element can maintain its high displaying quality even when incorporated in a liquid crystal display.

The present invention provides an optical element comprising: a liquid crystal layer made by forming and curing a film of a liquid crystalline material; and a protective layer formed on the liquid crystal layer, the protective layer having hardness high enough to prevent the liquid crystal layer from being deformed by externally exerted forces.

In the present invention, the protective layer preferably has a modulus of elasticity (=(elastic deformation)/(total deformation)) of 0.6 or more as determined by pushing an indenter into the protective layer with a test force of 2 mN in accordance with the universal hardness test method. It is also preferable that the protective layer be made from a material comprising a resin and a monomer. Further, it is preferable that the liquid crystalline material from which the liquid crystal layer is made has cholesteric regularity or nematic regularity. Furthermore, in the present invention, it is preferable that the optical element further comprises an alignment substrate that supports the liquid crystal layer, the alignment substrate being disposed on the surface of the liquid crystal layer opposite to the surface of the protective layer.

Furthermore, in the present invention, it is preferable that at least a part of the outer peripheral region of the liquid crystal layer is removed, and that the protective layer is formed to cover the upper surface as well as at least a part of the side surface of the liquid crystal layer formed on the alignment substrate.

Furthermore, in the present invention, it is preferable that the liquid crystal layer formed on the alignment substrate includes a plurality of regions corresponding to display regions of the respective colors of red, green and blue, the regions being formed with spaces therebetween, and that the protective layer is formed to cover the upper surface of the liquid crystal layer and to fill the spaces between the respective regions of the liquid crystal layer.

Furthermore, in the present invention, it is preferable that the optical element further comprises an alignment film and an electrode disposed on the surface of the protective layer opposite to the surface of the liquid crystal layer, the alignment film and the electrode aligning and driving liquid crystals in a liquid crystal cell, respectively.

Furthermore, in the present invention, it is preferable that the optical element further comprises a color filter layer of a light absorption type disposed between the liquid crystal layer and the protective layer, or disposed on the surface of the protective layer opposite to the surface of the liquid crystal layer.

In the present invention, it is preferable that the liquid crystal layer functions as at least an element selected from the group consisting of a polarized-light-separating element, a color filter and a retardation film.

In the present invention, on top of the liquid crystal layer made by forming and curing a film of a liquid crystalline material is formed the protective layer having hardness high enough to prevent the liquid crystal layer from being deformed by externally exerted forces. Therefore, the film thickness distribution of the liquid crystal layer remains uniform even when forces are externally exerted to the optical element in the process of production of the optical element or in the course of incorporation of the optical element in a liquid crystal display. The optical element can thus maintain its high displaying quality even when incorporated in a liquid crystal display.

Further, according to the present invention, at least a part of the outer peripheral region of the liquid crystal layer is removed, and the protective layer is formed to cover the upper surface as well as at least a part of the side surface of the liquid crystal layer formed on the alignment substrate. Thus, even when incorporated in a liquid crystal display, a sealed portion of the liquid crystal cell is prevented from interfering with the liquid crystal layer. In addition, since the protective layer is formed to cover at least a part of the side surface of the liquid crystal layer, a deterioration of the liquid crystal layer caused by a solution from outside can effectively be prevented.

Furthermore, according to the present invention, a plurality of regions corresponding to display regions of the respective colors of red, green and blue, the regions being formed with spaces therebetween, are provided to the liquid crystal layer formed on the alignment substrate. In addition, the protective layer is formed to cover the upper surface of the liquid crystal layer and to fill the spaces between the respective layers of the liquid crystal layer. Since each part of the protective layer, which fills the spaces between the respective regions of the liquid crystal layer, functions like a column, the liquid crystal layer can more efficiently be prevented from being deformed by externally exerted forces.

Furthermore, according to the present invention, a color filter layer of a light absorption type is disposed between the liquid crystal layer and the protective layer, or disposed on the surface of the protective layer opposite to the surface of the liquid crystal layer. Thus, both of the protective layer and the liquid crystal layer can be protected by the color filter layer of a light absorption type having high hardness, and therefore the liquid crystal layer can more efficiently be prevented from being deformed by externally exerted forces.

BRIEF DESCRIPTION OF THE DRAWINGS

In the drawings,

FIG. 1 is a diagrammatic cross-sectional view for illustrating an embodiment of the optical element according to the present invention;

FIG. 2 is a flow chart of the process for producing the optical element shown in FIG. 1.

DETAILED DESCRIPTION OF THE INVENTION

Figure 3A:
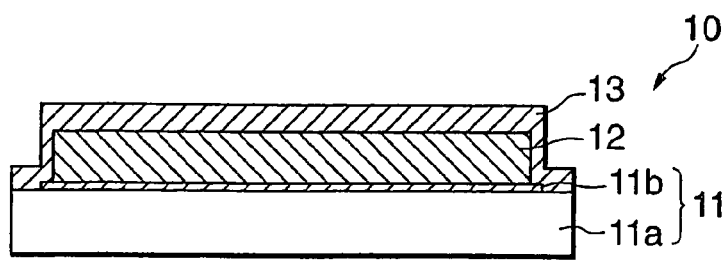
FIGS. 3A and 3B are schematic cross-sectional views showing a first modification of the optical element shown in FIG. 1.

By referring to the accompanying drawings, embodiments of the present invention will be described hereinafter.

The whole structure of an optical element according to this embodiment is firstly described with reference to FIG. 1.

As shown in FIG. 1, an optical element 10 is composed of an alignment substrate 11, a liquid crystal layer 12 provided on the alignment substrate 11, made by forming and curing a film of a liquid crystalline material, and a protective layer 13 having high hardness, formed on the liquid crystal layer 12.

The alignment substrate 11 is for supporting the liquid crystal layer 12, and also for aligning liquid crystalline molecules in the liquid crystal layer 12. This alignment substrate 11 is in contact with the surface of the liquid crystal layer 12 opposite to the surface that is in contact with the protective layer 13. Examples of materials that can be used for the alignment substrate 11 include glass substrates on which films of alignment materials such as polyimide are formed and then rubbed, glass substrates on which films of polymeric compounds that serve as optical alignment layers are formed and then irradiated with polarized UV (ultraviolet light), and oriented PET (polyethylene terephthalate) films.

The liquid crystal layer 12 is made from a liquid crystalline material having cholesteric regularity and has the polarized-light-selecting property (polarized-light-separating property) of separating a component polarized (circularly polarized) in one direction from a component polarized in the opposite direction according to the physical orientation (planar orientation) of liquid crystalline molecules in the liquid crystal layer 12. Thanks to this property, the optical element 10 including the liquid crystal layer 12 can function as a polarized-light-separating element, a color filter, or a retardation film. For the liquid crystal layer 12, there can be used liquid crystalline molecules (liquid crystalline monomers or oligomers) that are polymerized when irradiated with ultraviolet light, electron beams, or the like, as well as liquid crystalline polymers.

When using, for example, photopolymerizable liquid crystalline monomers, a chiral nematic liquid crystal (cholesteric liquid crystal) is obtained by adding a chiral agent to liquid crystalline monomers (nematic liquid crystal) presenting a nematic liquid crystal phase.

More specifically, a nematic liquid crystal preferably has two or more polymerizable functional groups. For example, liquid crystalline monomers shown in the below chemical formulas (1) to (10) can be used to form the liquid crystal layer 12. In the chemical formulas (1) to (10), "X" preferably represents 2 to 6 (integral number).

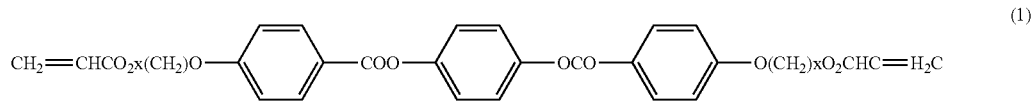
(1)

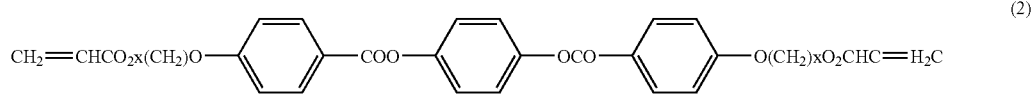
(2)

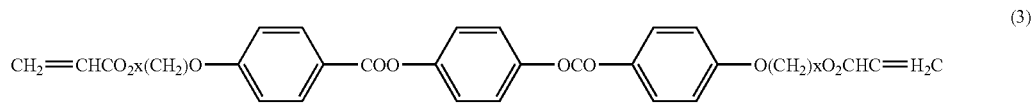
(3)

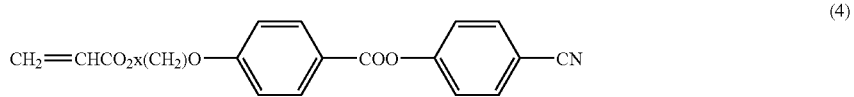
(4)

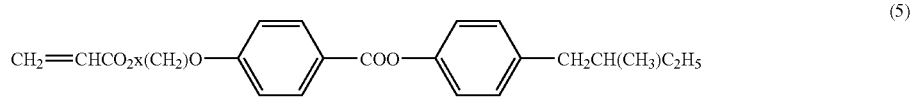
(5)

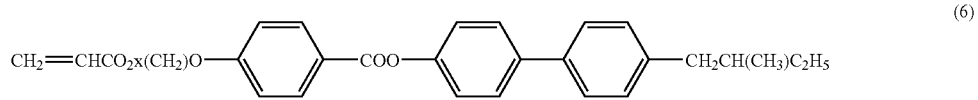
(6)

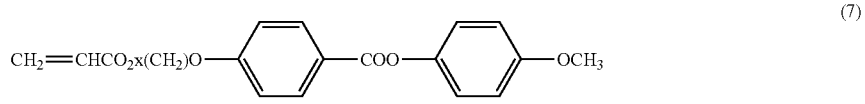
(7)

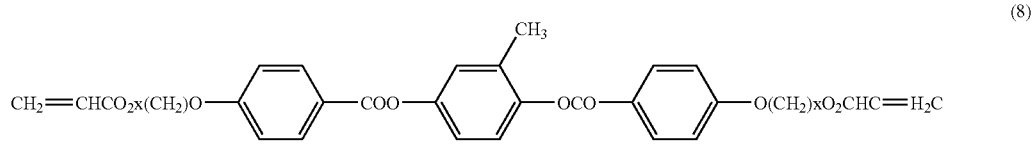
(8)

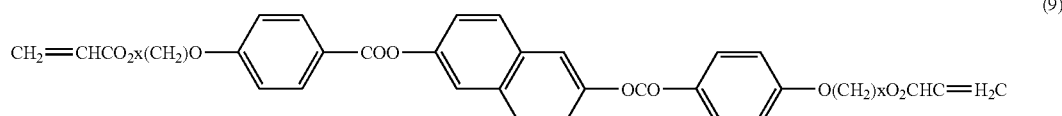
(9)

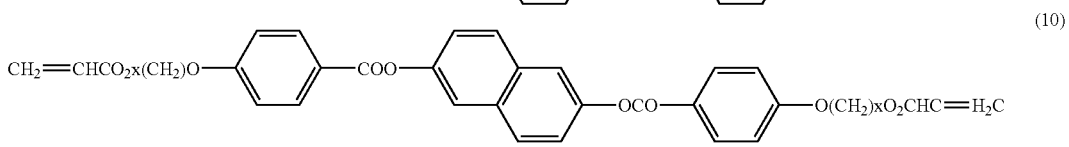
(10)

Figure 9:
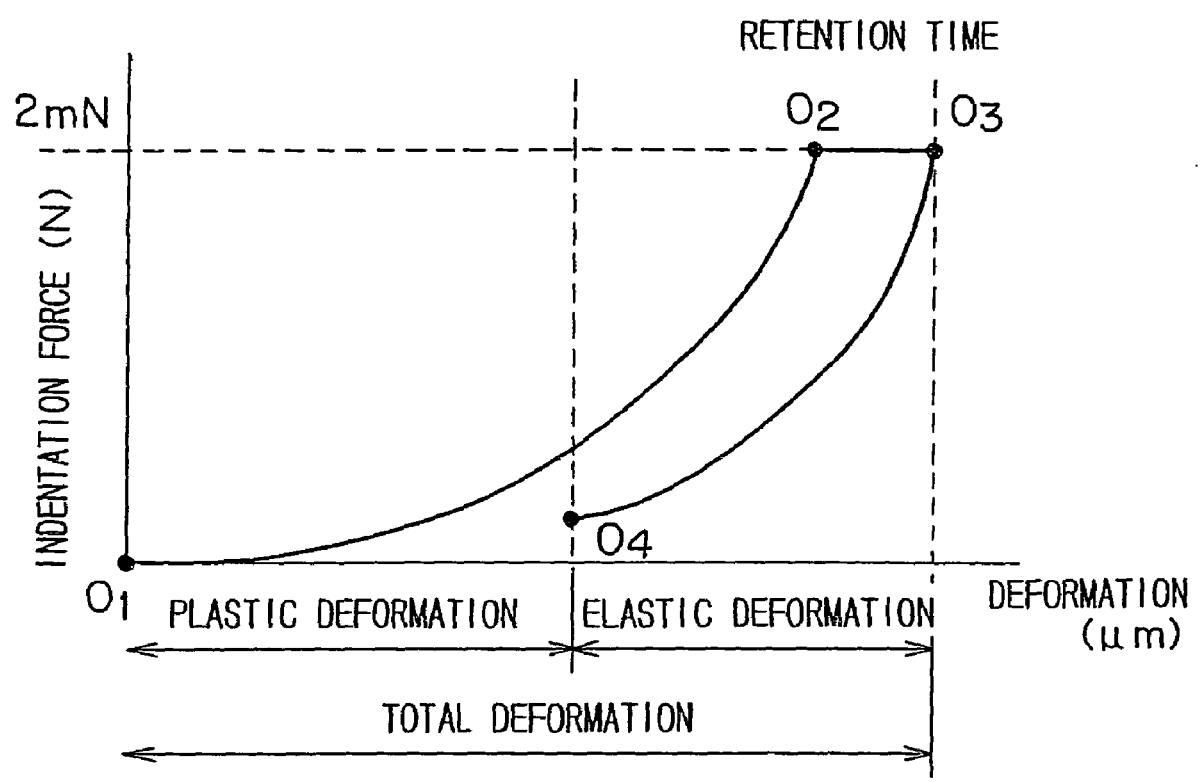
FIG. 9 is a chart for illustrating the hardness (modulus of elasticity) of the optical element shown in FIG. 1.

A chiral agent preferably has a polymerizable functional group at its terminal. For example, chiral agents shown in the below chemical formulas (11) to (14) can be used. Alternately, chiral agents disclosed in Japanese Patent Laid-Open Publications Nos. 2000-95883, 245960/1996 and 53074/1997 can also be used to form the liquid crystal layer 12. In the chemical formulas (11) to (14), "X" preferably represents 2 to 6 (integral number).

predetermined force (2 mN in the case shown in FIG. 9), the test object is deformed, drawing a hysteresis curve (indentation force versus deformation) as shown in FIG. 9. As shown in this figure, after the test object is deformed from initial point $O_1$, at which the indentation force is 0, to midpoint $O_2$, at which the indentation force is 2 mN, the indentation force is maintained 2 mN for a certain period of retention time during which the deformation of the test object changes from

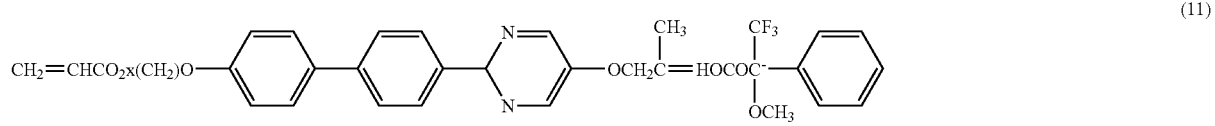

(11)

(12)

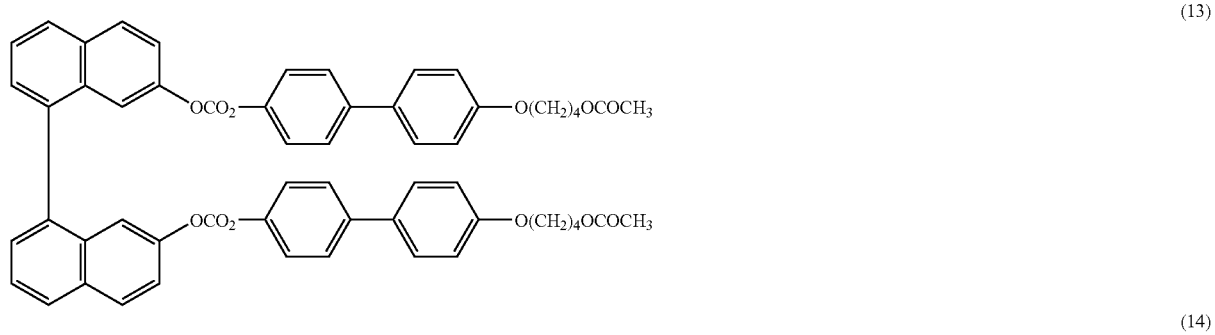

(13)

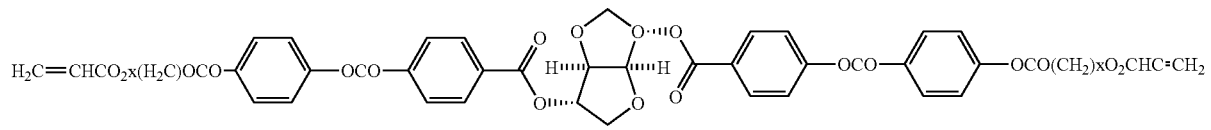

(14)

The protective layer 13 is for preventing the liquid crystal layer 12 from being deformed by externally exerted forces. Examples of materials that can be used for the protective layer 13 include resins such as acrylic resins and urethane resins, and mixtures of two or more monomers selected from acrylic monomers, urethane monomers, and so forth.

Preferably, the protective layer 13 has a modulus of elasticity (=(elastic deformation)/(total deformation)) of 0.6 or more and a plastic deformation of 0.5 μm or less as determined by pushing an indenter into the protective layer 13 with a test force of 2 mN in accordance with the universal hardness test method. Further, it is preferable that the optical element 10 as shown in FIG. 1 (the whole body of the protective layer 13, the liquid crystal layer 12 and the alignment substrate 11) has a modulus of elasticity of 0.6 or more and a plastic deformation of 0.5 μm or less as determined by pushing, from the protective layer 13 side, an indenter into the liquid crystal layer 12 with a test force of 2 mN in accordance with the universal hardness test method.

The universal hardness test method is that an indenter is pushed into a test object and the depth of indenter penetration (i.e., deformation) is measured (standard: DIN 50359). In this method, when an indenter is pushed into a test object with a midpoint $O_2$ to midpoint $O_3$. The indentation force is then released. As a result, the deformation of the test object returns to final point $O_4$. If the test object is a perfectly elastic body, the deformation at final point $O_4$ is zero. Actually, however, there is no such case that the test object is a perfectly elastic body, so that the deformation of the test object at final point $O_4$ is a positive value. This value is equivalent to the plastic deformation. When the deformation at the point of time at which the indentation of the indenter is completed (midpoint $O_3$) is taken as the total deformation, the value obtained by subtracting the above-described plastic deformation from the total deformation is equal to the elastic deformation. In general, it is possible to define, by the use of these deformations, the modulus of elasticity as follows: (modulus of elasticity)= (elastic deformation)/(total deformation). The modulus of elasticity can be used as a measure of the hardness of a test object. Namely, a test object having a smaller plastic deformation and a greater modulus of elasticity is harder; on the contrary, a test object having a greater plastic deformation and a smaller modulus of elasticity is softer.

Although the hardness of the protective layer 13 and that of the whole optical element 10 are herein determined by the universal hardness test method, they may also be determined by the pencil hardness test method, the Vickers hardness test method, or the like.

Next, a process for producing the optical element 10 shown in FIG. 1 is described with reference to FIG. 2. Taken herein as an example to describe the process is a case where a cholesteric liquid crystalline monomer that is polymerized when irradiated with ultraviolet light is used to form the liquid crystal layer 12.

First of all, a cholesteric liquid crystalline monomer solution containing a photopolymerization initiator is prepared. This solution is applied to an alignment substrate 11 and is then dried to form a liquid crystal layer 12' in the uncured state (FIG. 2(a)).

Ultraviolet light with a predetermined amount of energy is then applied to the uncured liquid crystal layer 12' in a predetermined atmosphere to obtain a liquid crystal layer 12 in the cured state (FIG. 2(b)).

Thereafter, the cured liquid crystal layer 12 is heated, as needed, at a predetermined temperature for baking (FIG. 2(c)), and is then coated with a material for forming a protective layer 13 (FIG. 2(d)). Thus, the optical element 10 is finally produced.

In this embodiment, the protective layer 13 having high hardness is formed on the liquid crystal layer 12 made by forming and curing a film of a liquid crystalline material to protect the liquid crystal layer 12 from being deformed by externally exerted forces. Therefore, the film thickness distribution of the liquid crystal layer 12 remains uniform even when forces are externally exerted to the optical element 10 in the process of production of the optical element 10 or in the course of incorporation of the optical element 10 in a liquid crystal display. The optical element 10 can thus maintain its high displaying quality even when incorporated in a liquid crystal display.

In the above embodiment, a case where the liquid crystal layer 12 is formed of a liquid crystalline material having cholesteric regularity is taken as an example. However, not limited thereto, a case where the liquid crystal layer 12 is formed of a liquid crystalline material having nematic regularity may also be applied to the present invention. The liquid crystal 12 formed of a liquid crystalline material having nematic regularity can suitably fulfill a function as a retardation film.

In the above embodiment, a case where the liquid crystal layer 12 is formed over the whole surface of the alignment substrate 11 is taken as an example. However, not limited thereto, the crystal liquid layer 12 formed on the alignment substrate 11 may be suitably patterned.

Figure 3B:
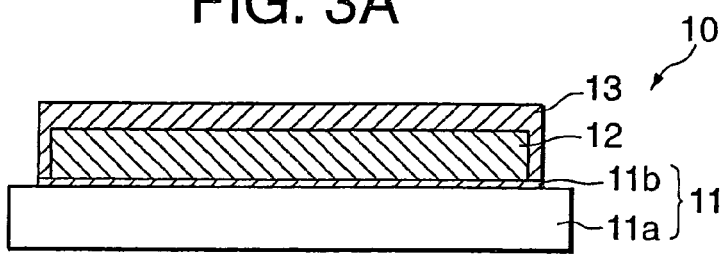

Specifically, as shown in FIGS. 3A and 3B, it is preferable that the liquid crystal layer 12 formed on the alignment substrate 11 is patterned such that the outer peripheral region of the liquid crystal layer 12 is removed, and that the protective layer 13 is formed to cover the upper surface as well as the side surface of the liquid crystal layer 12 formed on the alignment substrate 11. Thus, even when incorporated in a liquid crystal display, a sealed portion of the liquid crystal cell is prevented from interfering with the liquid crystal layer 12. In addition, since the protective layer 13 is formed to cover the side surface of the liquid crystal layer 12, a deterioration of the liquid crystal layer 12 caused by a solution from outside can effectively be prevented. In FIG. 3A, only the outer periphery of the liquid crystal layer 12 is removed, and the outer periphery of the protective layer 13 is not removed. However, not limited thereto, as shown in FIG. 3B, the outer periphery of the protective layer 13 may also be removed so as to correspond to the pattern of the liquid crystal layer 12. In FIGS. 3B and 3 (b), the alignment substrate 11 is composed of a support substrate 11a such as a glass substrate, and an alignment film 11b formed on the support substrate 11a and corresponding to the pattern (pattern having the outer periphery being removed) of the liquid crystal layer 12.

Figure 4:
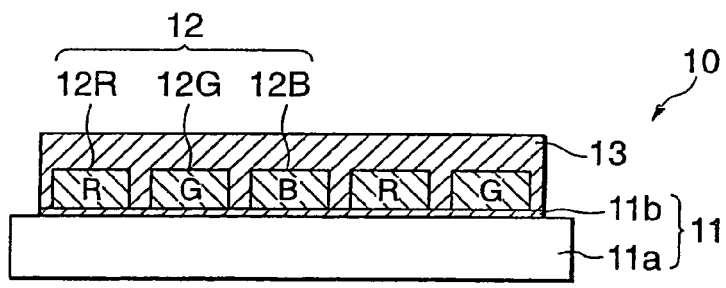
FIG. 4 is a schematic cross-sectional view showing a second modification of the optical element shown in FIG. 1.

As shown in FIG. 4, it is also preferable that the liquid crystal layer 12 formed on the alignment substrate 11 is patterned such that a plurality of regions 12R, 12G and 12B correspond to display regions of the respective colors of red, green, and blue, the regions being formed with spaces therebetween. It is also preferable that the protective layer 13 is formed to cover the upper surface of the liquid crystal layer 12 and to fill the spaces between the respective regions 12R, 12G, and 12B of the liquid crystal layer 12. Since each part of the protective layer 13, which fills the spaces between the respective regions 12R, 12G and 12B of the liquid crystal layer 12, functions like a column, the liquid crystal layer 12 can more efficiently be prevented from being deformed by externally exerted forces. In FIG. 4, the alignment substrate 11 is composed of the support substrate 11a such as a glass substrate, and the alignment film 11b formed on the support substrate 11a and corresponding to the pattern (pattern having the outer periphery being removed) of the liquid crystal layer 12. FIG. 4 shows the regions 12R, 12G and 12B individually corresponding to the regions of the respective pixels of red, green and blue. However, not limited thereto, the respective regions 12R, 12G and 12B may be divided into two or more regions with spaces therebetween.

Figure 5:
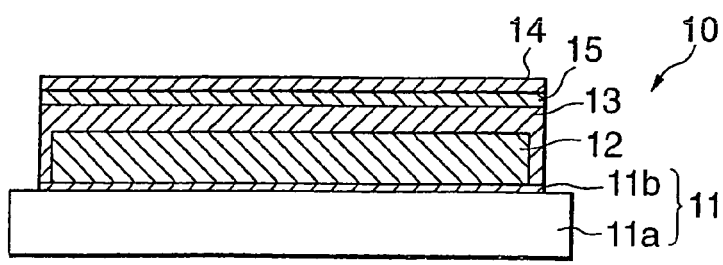
FIG. 5 is a schematic cross-sectional view showing a third modification of the optical element shown in FIG. 1.

As shown in FIG. 5, in the optical element 10 shown in FIG. 3B, an alignment film 14 and a transparent electrode 15 such as an ITO film may be disposed on the surface of the protective layer 13 opposite to the surface of the liquid crystal layer 12, the alignment film 14 and the transparent electrode 15 aligning and driving liquid crystals in a liquid crystal cell, respectively. In FIG. 5, although the optical element 10 shown in FIG. 3B is taken as an example, the alignment film 14 and the transparent electrode 15 may be disposed similarly to the optical element 10 shown in FIGS. 1, 3A and 4. In FIG. 5, the alignment substrate 11 is composed of the support substrate 11a such as a glass substrate, and the alignment film 11b formed on the support substrate 11a and corresponding to the pattern (pattern having the outer periphery being removed) of the liquid crystal layer 12.

Figure 6A:
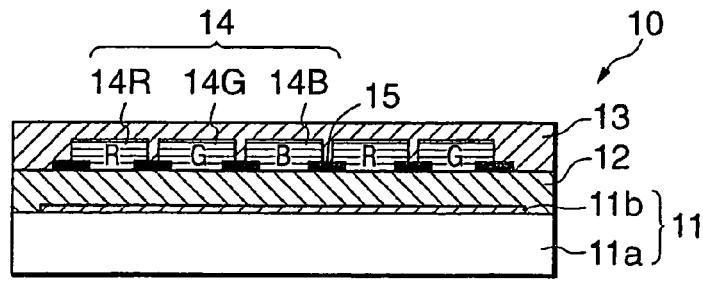
FIGS. 6A and 6B are schematic cross-sectional views showing a fourth modification of the optical element shown in FIG. 1.
Figure 6B:
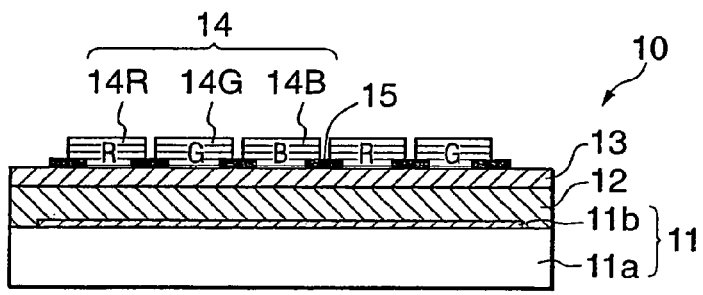
Figure 7A:
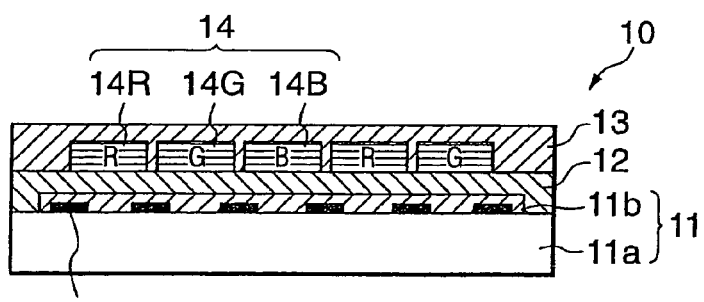
FIGS. 7A and 7B are schematic cross-sectional views showing a fifth modification of the optical element shown in FIG. 1.
Figure 7B:
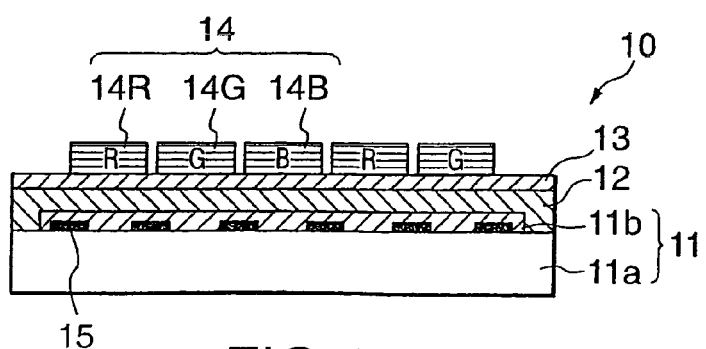

As shown in FIGS. 6A and 6B, a color filter layer 14 of a light absorption type (pigment dispersion type) including a plurality of colored regions 14R, 14G and 14B may be disposed between the liquid crystal layer 12 and protective layer 13, or may be disposed on the surface of the protective layer 13 opposite to the surface of the liquid crystal layer 12. The plurality of colored regions 14R, 14G, and 14B correspond to display regions of the respective colors of red, green and blue. Thus, both of the protective layer 13 and the liquid crystal layer 12 can be protected by the color filter layer 14 of a light absorption type having high hardness, and therefore the liquid crystal layer 12 can more efficiently be prevented from being deformed by externally exerted forces. In FIGS. 6A and 6B, the alignment substrate 11 is composed of the support substrate 11a such as a glass substrate and the alignment film 11b formed on the support substrate 11a. FIGS. 6A and 6B show a black matrix 15 made of chrome or resin, the black matrix 15 being formed on each region between the plurality of colored regions 14R, 14G, and 14B adjacent to each other. In FIGS. 6A and 6B, the black matrix 15 is formed in contact with the respective colored regions 14R, 14G and 14B of the color filter layer 14. Alternately, as shown in FIGS. 7A and 7B, the black matrix 15 may be apart from the respective colored regions 14R, 14G and 14B of the color filter layer 14, and formed on the support substrate 11a of the alignment substrate 11.

Figure 8A:
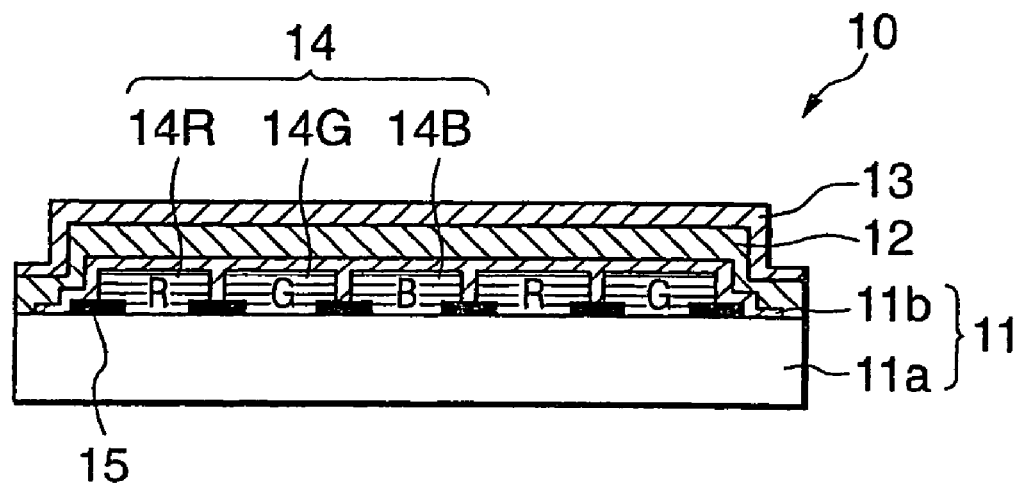
FIG. 8A and 8B are schematic cross-sectional views showing a sixth modification of the optical element shown in FIG. 1.
Figure 8B:
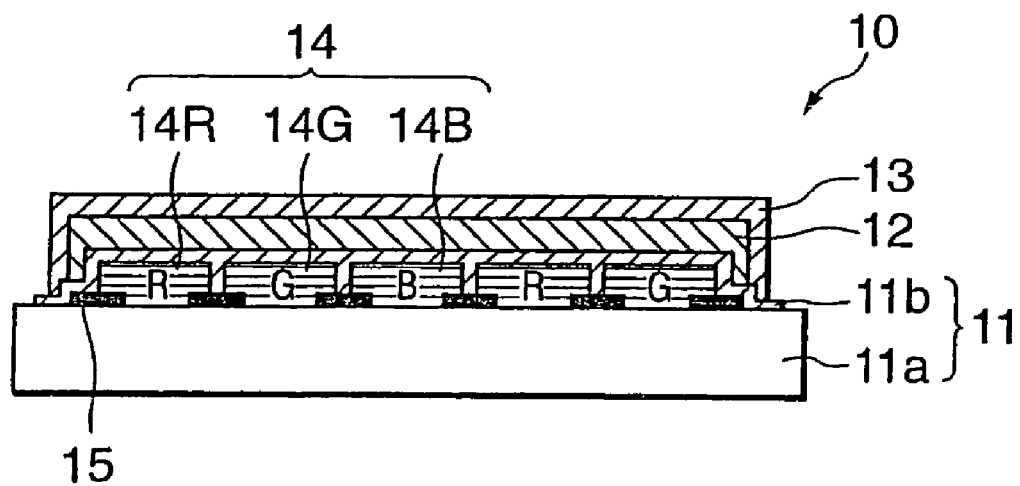

FIGS. 6A, 6B, 7A and 7B show the color filter layer 14 of a light absorption type being disposed between the liquid crystal layer 12 and the protective layer 13, or disposed on the surface of the protective layer 13 opposite to the surface of the liquid crystal layer 12. However, not limited thereto, the color filter layer 14 of a light absorption type may be disposed under the liquid crystal layer 12, as shown in FIGS. 8A and 8B. In this modification, the liquid crystal layer 12 can be more tightly in contact with the alignment substrate 11, so that an improved displaying quality can be obtained when incorporated in a liquid crystal display.

EXAMPLE

The present invention will now be explained more specifically by referring to the following example, which is not intended to limit or restrict the scope of the invention in any way.

Example 1

A polyimide film (LX1400 (manufactured by Hitachi Chemical Co., Ltd., Japan)) with a thickness of 0.02 μm was formed on a glass substrate. After baked at 250° C., the polyimide film was then subjected to rubbing treatment for alignment.

The rubbed polyimide film on the glass substrate was spin-coated with a solution containing a cholesteric liquid crystal having a composition as described below.

Nematic liquid crystal (above formula (8)): 95.45% by weight

Chiral agent (above formula (14)): 4.55% by weight

Polymerization initiator (Irg907): 5% by weight Surface active agent (below formula (15)): 0.05% by weight Toluene: 175% by weight

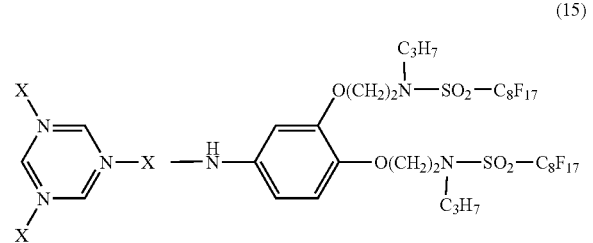

(15)

As described above, the cholesteric liquid crystal solution contains a cholesteric liquid crystal (chiral nematic liquid crystal) which is a mixture of a nematic liquid crystal and a chiral agent.

The coating film applied to the polyimide film on the glass substrate was subjected to a treatment for alignment by drying on a hot plate at 80° C. for 1 minute. Then, the coating film was visually observed that the film presented a cholesteric phase.

Next, the coating film is irradiated with ultraviolet light (20 mW/cm$^2$, 365 nm) by using a ultra-high pressure mercury lamp for 10 seconds to obtain a cholesteric liquid crystal layer. The thickness of the cholesteric liquid crystal layer was made 3.0 μm to make the selective reflectance of the cholesteric liquid crystal layer 100%. From the measurement using a spectrophotometer, it was found that the selective reflection wave range of the cholesteric liquid crystal layer was centered at 515 nm.

JNPC-80 (manufactured by JSR Corporation, Japan), a material for forming a protective layer, was applied by spin coating to the cholesteric liquid crystal layer formed in the above-described manner, and was dried on a hot plate at 90° C. for 1 minute. After that, the coating film is irradiated with ultraviolet light (20 mW/cm$^2$, 365 nm) to expose it by using a ultra-high pressure mercury lamp for 20 seconds, and then the irradiated coating film was baked for 1 hour to finally form a protective layer. The thickness of the protective layer was made 2.0 μm. Separately, a protective layer was formed directly on a glass substrate in the same manner, and its modulus of elasticity was determined by pushing an indenter into the protective layer with a test force of 2 mN in accordance with the universal hardness test method. As a result, the modulus of elasticity was found to be 0.62.

There was thus finally obtained an optical element composed of the cholesteric liquid crystal layer having thereon the protective layer. The modulus of elasticity of this optical element according to Example 1 was determined by pushing, from the protective layer side, an indenter into the cholesteric liquid crystal layer with a test force of 2 mN in accordance with the universal hardness test method. As a result, the modulus of elasticity was 0.65, and the plastic deformation was 0.45 μm.

Example 2

An optical element was produced in the same manner as that of Example 1, other than that the thickness of the protective layer was made 1.5 μm. The modulus of elasticity of thus obtained optical element according to Example 2 was determined by pushing, from the protective layer side, an indenter into the cholesteric liquid crystal layer with a test force of 2 mN in accordance with the universal hardness test method. As a result, the modulus of elasticity was 0.60, and the plastic deformation was 0.48 μm. A protective layer was formed directly on a glass substrate in the same manner as that of Example 1, and its modulus of elasticity was determined by pushing an indenter into the protective layer with a test force of 2 mN in accordance with the universal hardness test method. As a result, the modulus of elasticity was found to be 0.60.

Example 3

An optical element was produced in the same manner as that of Example 1, other than that JSS-341 (manufactured by JSR Corporation) was used as a material for forming a protective layer, with its thickness being 1.5 μm, and that the protective layer was not subjected to exposure process when forming the protective layer. The modulus of elasticity of thus obtained optical element according to Example 3 was determined by pushing, from the protective layer side, an indenter into the cholesteric liquid crystal layer with a test force of 2 mN in accordance with the universal hardness test method. As a result, the modulus of elasticity was 0.65, and the plastic deformation was 0.46 μm. A protective layer was formed directly on a glass substrate in the same manner as that of Example 1, and its modulus of elasticity was determined by pushing an indenter into the protective layer with a test force of 2 mN in accordance with the universal hardness test method. As a result, the modulus of elasticity was found to be 0.64.

Example 4

An optical element was produced in the same manner as that of Example 1, other than that an ITO layer (1500 Å thickness) as a transparent electrode was formed on a surface of a protective layer by spattering, and then a polyimide film (LX1400 (manufactured by Hitachi Chemical Co., Ltd., Japan); 0.07 µm thickness) as an alignment film was formed on the ITO layer. The polyimide film on the ITO layer was formed in the same manner as the alignment film on a glass substrate in Example 1. The modulus of elasticity of thus obtained optical element according to Example 4 was determined by pushing, from the protective layer side, an indenter into the cholesteric liquid crystal layer with a test force of 2 mN in accordance with the universal hardness test method. As a result, the modulus of elasticity was 0.66, and the plastic deformation was 0.46 µm. A protective layer was formed directly on a glass substrate in the same manner as that of Example 1, and its modulus of elasticity was determined by pushing an indenter into the protective layer with a test force of 2 mN in accordance with the universal hardness test method. As a result, the modulus of elasticity was found to be 0.62.

Example 5

An optical element was produced in the same manner as that of Example 4, other than that a color filter layer of a light absorption type (pigment dispersion type) was formed between a liquid crystal layer and a protective layer by a photolithography method. The modulus of elasticity of thus obtained optical element according to Example 5 was determined by pushing, from the protective layer side, an indenter into the cholesteric liquid crystal layer with a test force of 2 mN in accordance with the universal hardness test method. As a result, the modulus of elasticity was 0.67, and the plastic deformation was 0.53 µm. A protective layer was formed directly on a glass substrate in the same manner as that of Example 1, and its modulus of elasticity was determined by pushing an indenter into the protective layer with a test force of 2 mN in accordance with the universal hardness test method. As a result, the modulus of elasticity was found to be 0.62.

Example 6

An optical element was produced in the same manner as that of Example 4, other than that a color filter layer of a light absorption type (pigment dispersion type) was formed between a glass substrate and a polyimide film by a photolithography method. The modulus of elasticity of thus obtained optical element according to Example 6 was determined by pushing, from the protective layer side, an indenter into the cholesteric liquid crystal layer with a test force of 2 mN in accordance with the universal hardness test method. As a result, the modulus of elasticity was 0.64, and the plastic deformation was 0.57 µm. A protective layer was formed directly on a glass substrate in the same manner as that of Example 1, and its modulus of elasticity was determined by pushing an indenter into the protective layer with a test force of 2 mN in accordance with the universal hardness test method. As a result, the modulus of elasticity was found to be 0.62.

Example 7

An optical element was produced in the same manner as that of Example 1, other than that an $SiO_2$ layer (0.3 µm thickness) as another protective layer was formed on a surface of the formed protective layer by spattering. The modulus of elasticity of thus obtained optical element according to Example 7 was determined by pushing, from the laminated protective layer side, an indenter into the cholesteric liquid crystal layer with a test force of 2 mN in accordance with the universal hardness test method. As a result, the modulus of elasticity was 0.67, and the plastic deformation was 0.54 µm. A laminated protective layer (JNPC-80 layer and $SiO_2$ layer) was formed directly on a glass substrate in the same manner as that of Example 1, and its modulus of elasticity was determined by pushing an indenter into the laminated protective layer with a test force of 2 mN in accordance with the universal hardness test method. As a result, the modulus of elasticity was found to be 0.66.

Comparative Example 1

An optical element was produced in the same manner as that of Example 1, other than that no protective layer was formed. The modulus of elasticity of thus obtained optical element according to Comparative Example 1 was determined by pushing, from the protective layer side, an indenter into the cholesteric liquid crystal layer with a test force of 2 mN in accordance with the universal hardness test method. As a result, the modulus of elasticity was 0.54, and the plastic deformation was 0.72 µm.

Evaluation Result

After producing each optical element according to Examples 1 to 7 in an actual production line, it was incorporated in a liquid crystal display. In this process, the film thickness distribution of the liquid crystal layer remained uniform, and the displaying quality of the display finally obtained was found excellent. On the other hand, after producing an optical element according to Comparative Example 1 in an actual production line, it was incorporated in a liquid crystal display. In this process, the liquid crystal layer could not remain its uniform film thickness distribution, and the displaying quality of the display finally obtained was lowered.

Thus, according to the present invention, the film thickness distribution of the liquid crystal layer remains uniform even when forces are externally exerted to the optical element in the process of production of the optical element or in the course of incorporation of the optical element in a liquid crystal display, and the optical element can maintain its high displaying quality even when incorporated in a liquid crystal display.

What is claimed is:

1. An optical element, comprising:
   a liquid crystal layer made by forming and curing a film of a liquid crystalline material, the liquid crystal layer including a liquid crystal phase in a solidified state such that a molecular orientation of the liquid crystal phase is maintained even when an electrical force is applied; and
   a protective layer formed on the liquid crystal layer, the protective layer having a hardness sufficient to prevent the liquid crystal layer from being deformed by externally exerted forces,
   the protective layer having a thickness of 1.5 to 2.7 µm, and being formed by applying to the liquid crystal layer a material for the protective layer, drying the material, irradiating the material with ultraviolet light, and baking the material so that the protective layer is directly in contact with the liquid crystal layer.

2. The optical element according to claim 1, wherein the protective layer has a modulus of elasticity (=(elastic deformation)/(total deformation)) of 0.6 or more as determined by pushing an indenter into the protective layer with a test force of 2 mN in accordance with the universal hardness test method.

3. The optical element according to claim 1, wherein the protective layer is made from a material that comprises a resin and a monomer.

4. The optical element according to claim 1, wherein the liquid crystalline material from which the liquid crystal layer is made has cholesteric regularity.

5. The optical element according to claim 1, wherein the liquid crystalline material from which the liquid crystal layer is made has nematic regularity.

6. The optical element according to claim 1, further comprising an alignment substrate that supports the liquid crystal layer, the alignment substrate being disposed on a surface of the liquid crystal layer opposite from the protective layer.

7. The optical element according to claim 1, wherein the protective layer has a thickness of 1.5 to 2.0 µm.

* * * * *